United States Patent
Shimizu et al.

[11] Patent Number: 5,885,318
[45] Date of Patent: Mar. 23, 1999

[54] BUSHING BASE PLATE AND PROCESS OF PREPARING SAME

[75] Inventors: Susumu Shimizu, Tokyo; Makoto Mitani, Kanagawa; Katsumi Suguro, Kanagawa; Toshio Honma, Kanagawa, all of Japan

[73] Assignee: Tanaka Kikinzoku Kogyo K.K., Japan

[21] Appl. No.: 402,136

[22] Filed: Mar. 10, 1995

[51] Int. Cl.⁶ ............................ C03B 37/095; B21D 39/06
[52] U.S. Cl. ............................ 65/493; 65/495; 65/497; 76/107.6; 29/523; 29/525; 228/173.4; 228/193; 156/293
[58] Field of Search .................. 65/495, 492, 493, 65/497, 483, 496; 425/72.2, 461; 29/523, 525, 234; 76/107.4, 107.6; 228/173.4, 174, 193; 156/293

[56] References Cited

U.S. PATENT DOCUMENTS

| | | | |
|---|---|---|---|
| 3,475,147 | 10/1969 | Stalego | 65/497 |
| 3,526,487 | 9/1970 | Bour | 65/495 |
| 3,579,807 | 5/1971 | Matulewicz . | |
| 4,001,542 | 1/1977 | McCormick . | |
| 4,155,730 | 5/1979 | Biberbach et al. | 65/493 |
| 4,311,499 | 1/1982 | Eisenberg et al. | 65/495 X |
| 4,402,719 | 9/1983 | Bhatti | 65/492 X |
| 4,428,524 | 1/1984 | Bhatti et al. . | |
| 4,461,191 | 7/1984 | Palamara | 29/523 X |
| 4,759,784 | 7/1988 | Shono et al. | 65/497 X |
| 4,846,865 | 7/1989 | Hinze . | |
| 5,017,205 | 5/1991 | Shioura et al. | 62/493 |
| 5,062,876 | 11/1991 | Jensen | 65/497 X |

FOREIGN PATENT DOCUMENTS

| | | |
|---|---|---|
| 60-141637 | 7/1985 | Japan . |
| 5-306139 | 11/1993 | Japan . |
| 6-171971 | 6/1994 | Japan . |
| 6-279046 | 10/1994 | Japan . |

*Primary Examiner*—Curtis Mayes
*Attorney, Agent, or Firm*—Klauber & Jackson

[57] ABSTRACT

A bushing base plate comprised of a bushing base raw plate containing a circular or irregular aperture having inner surfaces and inner diameters; and a hollow tube having outer surfaces and out diameters which is inserted into the aperture and bonded thereto by thermal diffusion. Prior to insertion of the tube in the aperture, the outer diameters are greater than the inner diameters, thereby producing a pressing force between the outer surfaces of the tube and the inner surfaces of the aperture.

23 Claims, 11 Drawing Sheets

BUSHING BASE PLATE AND PROCESS OF PREPARING SAME

BACKGROUND OF THE INVENTION

This invention relates to a bushing base plate having a box filled with melted glass or a nozzle aperture of a bushing employed for preparing glass fibers or continuous glass filaments.

Several plates are currently employed as a bushing base plate. Generally, the bush base plate is prepared by conducting a perforation treatment of a bashing base raw plate and inserting a hollow tube processed in advance to the shape of a pipe into the aperture of the raw plate and bonded by means of welding. Another bushing base plate which is prepared by compressing raw material having a plate thickness thicker than that of a final product by means of rolling or pressing to extrude a projection, and thereafter conducting a perforation treatment to the extruded projection by means of pressing is also employed.

A glass fiber of thin denier and an effective production thereof by making many holes in a certain area with smaller pitches are demanded and a bushing base plate satisfying these requirements is highly requested.

When conventionally welding is conducted by making an aperture through the bushing base raw plate and inserting the hollow tube processed in advance to the shape of a pipe into the aperture of the raw plate, the bushing base raw plate 1 and the hollow tube 3 having a flow-out aperture 2 are as shown in FIG. 1 are welded at the base end of the hollow tube 3 by means of razor or plasma or resistive welding.

In this case, the hollow tube 3 in the shape of a pipe is finished so as to have a thin wall due to the spinning conditions of glass fibers. When the hollow tube is welded to the position perforated through the bushing base raw plate 1, the welding is performed at the base end 3a of the hollow tube 3 that is the flow-in side of the glass as shown in FIG. 1.

Since the wall thickness of the hollow tube 3 is thinner than the thickness of the bushing base raw plate 1, the size of the flow-out aperture is small and the pitch between two adjacent flow-out apertures is small so that the whole thickness of the bushing base raw plate 1 is difficult to be welded, only an upper portion of the raw plate 1 is welded as shown in FIG. 1. Because of this partial welding, the flow-out aperture is difficult to be processed to the shape which fits the flow conditions of glass or the spinning conditions.

When the thus manufactured bushing case plate 4 is employed successively for a long period of time at a high temperature, a creep strain is produced in the bushing base plate 4 receiving a pressure P of glass to be entirely deformed so as to have a swelling as shown in FIG. 2.

FIG. 3 is an enlarged view showing the above fitting portion of the hollow tube 3. Due to the creep deformation of the bushing base raw plate 1, a space is formed between the raw plate 1 and the hollow tube 3 to produce a crack at the above welded portion so that a drawback of enabling the glass fiber spinning because of the leakage of glass liquid. In the worst case, the hollow tube 3 may fall off.

This drawback is critical because even when only one of the flow-out apertures is cracked or falls off, an expensive Pt alloy bushing can be no longer employed so as to stop the production or the bushing with the defect may largely influence the quality and the cost of the glass fibers. It is a problem to be solved how to provide a bushing in which cracking and the falling off are difficult to occur.

A new process of preparing a bushing is proposed in Japanese laid open gazette No. 4-241105 or the like. This contemplates to perform the bonding employed Pt waxy material to the Pt alloy base plate. When a small amount of an element is added to Pt in case of a Pt—Au alloy or a reinforced alloy, that is, when the material possesses a melting point which is the same as or smaller than that of Pt as waxy material, it is supposed to be difficult to melt the Pt by employing Pt as the waxy material.

SUMMARY OF THE INVENTION

An object of the present invention is to provide a bushing base plate having stabilized bonding strength and a shape suitably fitted to spinning conditions so as to possess a long life and a process of preparing same.

A first invention in accordance with the present invention is a bushing base plate comprising a bushing base raw plate having a circular or irregular aperture and a hollow tube having an outer diameter portion larger than the inner diameter of the aperture which is inserted into the aperture at a certain interference and fixed to the bushing base raw plate, that are bonded by means of thermal diffusion.

Another embodiment of the first invention is a bushing base plate comprising a bushing base raw plate having a circular or irregular aperture and a hollow tubular swelling integrally connected to one end of the aperture wall, and a hollow tube having an outer diameter portion larger than the inner diameter of the aperture which is inserted into the aperture at a certain interference and fixed to the bushing base raw plate, that are bonded by means of thermal diffusion. The material of the hollow tube employed herein may be different from that of the bushing base raw plate.

The hollow tube or pipe is in advance processed to suitably possess designated product dimensions by means of an extrusion processing, a press processing or the like or may be processed to dimensions slightly higher or lower than the designated dimensions. The outer shape of the hollow tube is suitable for being inserted into the aperture with a certain interference. The hollow tube is inserted into the aperture and fixed to the bushing base raw plate by means of thermal diffusion treatment.

A second invention in accordance with the present invention is a process of preparing a bushing base plate which comprises rolling bushing base plate material to a flat bushing base raw plate having a thickness the same as that of a product, forming a required number of one or more circular or irregular apertures through the flat bushing base raw plate, inserting a hollow tube into the aperture at a certain interference for fixing the hollow tube to the bushing base raw plate, or inserting the said hollow tube and enlarging the hollow tube from the inside to have a desired interference, and bonding the both by means of thermal diffusion.

Another embodiment of the second invention is a process of preparing a bushing base plate which comprises perforating a circular or irregular aperture at the center of a swelling which is formed simultaneously with or before the formation of the said aperture through a bushing base raw plate, inserting a hollow tube into the aperture at a certain interference for fixing the hollow tube to the bushing base raw material, or inserting the said hollow tube and enlarging the hollow tube from the inside to have a desired interference, and bonding the both by means of thermal diffusion. Depending on the case, the bonded hollow tube and the swelling may be molded by means of plastic deformation to have a desired shape and desired dimensions.

The material of the hollow tube employed herein may be different from that of the bushing base raw plate.

The hollow tube or pipe is in advance processed to suitably possess designated product dimensions by means of an extrusion processing, a press processing or the like or may be processed to dimensions slightly higher or lower than the designated dimensions. The outer shape of the hollow tube is suitable for being inserted into and fixed to the aperture with a certain interference. The hollow tube is inserted into the aperture and fixed to the bushing base raw plate by means of thermal diffusion treatment.

A third invention in accordance with the present invention is a bushing base plate comprising a bushing base raw plate having a circular or irregular aperture of which an aperture size of its glass flow-in side is larger than that of a glass flow-out side, and a hollow tube having a glass flow-out end of which an outer size is the same as or smaller than the above aperture size of the glass flow-in side and a glass flow-in end of which an outer size is the same as or larger than the above aperture size of the glass flow-out side and having a circular section when the aperture of the bushing base raw plate is circular or an irregular section when the aperture of the bushing base raw plate is irregular, the hollow tube being inserted into the aperture of the raw plate and fixed thereto by means of thermal diffusion.

Another embodiment of the third invention is a bushing base plate which comprising a bushing base raw plate having a circular or irregular tapered or rounded aperture of which an aperture size of its upper (glass flow-in) side is larger than that of a glass flow-out side, and a hollow tube having a tapered or rounded glass flow-in end of which an outer size is larger than the above aperture size of the glass flow-out side and having a circular section when the aperture of the bushing base raw plate is circular or an irregular section when the aperture of the bushing base raw plate is irregular, the portion from the upper end of the tapered or rounded aperture to the lower end thereof of the hollow tube being tightly inserted into the wall of the aperture of the raw plate and fixed thereto by means of thermal diffusion.

The aperture of the bushing base raw plate and the hollow tube may have two or more tapered or rounded portions or two or more steps and the combination of a tapered portion and a rounded portion may be employed in addition to one tapered or rounded portion.

If one tapered portion is present, its tapered angle is preferably between 0.1 and 120°, while if two or more tapered portions are present, the tapered angle of at least one of the said tapered portion is preferably between 0.1 and 120°.

The hollow tube may be coated with base plate raw plate material at the glass flow-out side of the bushing base raw plate for a certain length for reinforcement.

The bushing base plate may be molded to have the tapered or rounded shape at the periphery including the bonding boundary of the glass flow-in side and/or glass flow-out side.

As the above hollow tube, a tube is employed having an inner circular section and an outer circular section.

As the above hollow tube, a tube is also employed having an inner irregular section and an outer irregular section.

As material of the above bushing base raw plate, a Pt—Rh alloy, a Pt—Rh—Pd alloy, platinum of which grains are stabilized by an oxide, an platinum alloy of which grains are stabilized by an oxide, a Pt—Au alloy, a Pt—Rh—Au alloy or a Pt—Rh—Pd—Au alloy may be employed, and material of the hollow tube, a Pt—Au alloy, a Pt—Rh—Au alloy, a Pt—Rh alloy, a Pt—Rh—Pd alloy, platinum of which grains are stabilized by an oxide or an platinum alloy or which grains are stabilized by an oxide may be employed.

A fourth invention in accordance with the present invention is a process of preparing a bushing base plate in accordance with the present invention comprises a process of preparing a bushing base plate which comprises perforating through a bushing base raw plate an aperture having a circular or irregular section of which an aperture size of its glass flow-in side is larger than that of a glass flow-out side, inserting and fixing to the aperture a hollow tube having a glass flow-out end of which an outer size is the same as or smaller than the above aperture size of the glass flow-in side and a glass flow-in end of which an outer size if larger than the above aperture size of the glass flow-out side and having a circular section when the aperture of the bushing base raw plate is circular or an irregular section when the aperture of the bushing base raw plate is irregular, and performing thermal diffusion for bonding.

Another embodiment of the fourth invention is a process of preparing a bushing base plate which comprises perforating through a bushing base raw plate a tapered or rounded aperture having a circular or irregular section of which an aperture size of its glass flow-in side is larger than that of a glass flow-out side, inserting from the glass flow-in side to the glass flow-out and fixing to the said aperture a hollow tube having a tapered or rounded upper (glass flow-in) end of which an outer size if larger than the above aperture size of the glass flow-out side and having a circular section when the aperture of the bushing base raw plate is circular or an irregular section when the aperture of the bushing base raw plate is irregular so as to tightly adhere the portion from the tapered or rounded upper end to the lower end thereof of the hollow tube to the whole wall or glass flow-out side wall of the aperture, and performing thermal diffusion for bonding.

When the aperture is perforated through the bushing base raw plate in this process of preparing the bushing base plate, a swelling portion surrounding the glass flow-out end of the aperture of the bushing base raw plate may be provided, and the hollow tube may be inserted into and fixed to the swelling portion and be bonded by means of thermal diffusion.

The bushing base plate may be prepared in accordance with the present invention by plastically deforming the bonding boundary of the glass flow-in side and/or the glass flow-out side to the tapered or rounded shape after the hollow tube is bonded to the aperture formed through the bushing base plate by means of thermal diffusion.

The bushing base plate may be prepared in accordance with the present invention by finishing the shape of the flow-out aperture to a desired shape and desired dimensions by means of the plastic deformation after the hollow tube is bonded to the aperture formed through the bushing base plate by means of thermal diffusion.

In this process of preparing the bushing base plate, after the hollow tube is bonded to the aperture formed through the bushing base plate by means of thermal diffusion and the plastic deformation is conducted, one or ore thermal diffusions may be repeated. The thermal diffusion may be conducted not only after the completion of the plastic deformation but also in the course of the plastic processing.

The thermal diffusion is preferably conducted in a temperature range between 500° C. and a temperature 20° C. lower than a melting point of the material.

As mentioned, the bushing base plate of the first invention enables the stable spinning by obtaining a structure in which end breakage is difficult to occur in the spinning generated at a center of densely distributed apertures because neither space nor is present in the bonding portion, the strength of the resulting bushing base plate is the same as that of the mother material to be endured by an operation for a long period of time and the material difficult to be wetted may be employed as the end chip portion.

According to the process of preparing the bushing base plate of the second invention, a bushing may be obtained which possesses a stable strength and a long life containing a bushing base plate having a plurality of apertures with a small diameter and narrow pitches. Since the wall thickness of the nozzle is thin, densely distributed apertures may be easily mechanically processed without skill, neither space nor is present in the bonding portion, the strength of the resulting bushing base plate is the same as that of the mother material to be endured by an operation for a long period of time and the material difficult to be wetted may be employed as the end chip portion, an apparatus of spinning glass fibers capable of performing stable spinning may be obtained by realizing a structure in which end breakage generated at the center of the densely distributed apertures is difficult to occur during the spinning.

According to the bushing base plate and the process of preparing same of the third and fourth invention, the bushing can be obtained which enables to the manufacture of uniform glass fibers having a high precision. Even if the deformation of the bushing base plate is produced due to the creep deformation produced by the pressure of glass and a high temperature exposed for a long period of time during the spinning, no space is created between the hollow tube and the bushing base raw plate bonded to each other constituting the glass flow-out aperture so that the crack formation at the welded portion and the falling-off of the hollow tube never occur. Accordingly, the above bushing is safely employed.

DETAILED DESCRIPTION OF THE INVENTION

Figure 1:
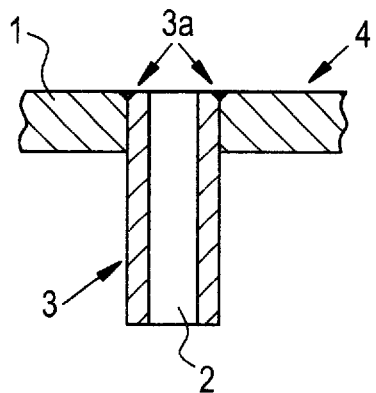
FIG. 1 is a sectional view showing one conventional example of the bonding portion between an aperture of a bushing base plate and a hollow tube.
Figure 2:
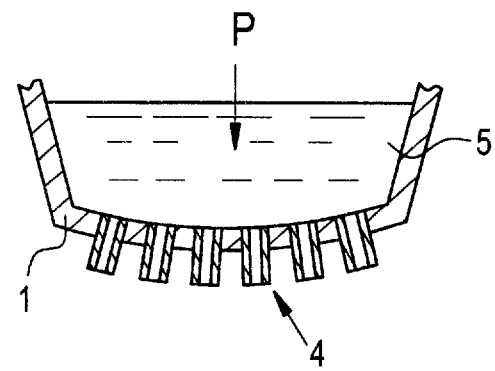
FIG. 2 is a sectional view showing another modified embodiment of the bushing base plate.
Figure 3:
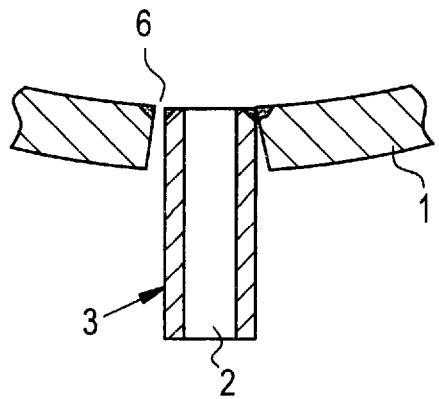
FIG. 3 is a sectional view showing a space in the bonding portion between an aperture of a conventional bushing base plate and a hollow tube.

Since the hollow tube constituting the flow-out aperture is inserted into the aperture perforated through the flat plate at a certain interference and fixed to the bushing base raw plate and bonded by means of thermal diffusion in the first invention, the metal materials of the both elements diffuse to each other in the the outer periphery of the aperture of the bushing base plate side and of the hollow tube under a condition of being fixed and pressed at a certain interference and the two elements are bonded so that its strength is the same as that of the mother material. "A certain interference" employed herein means a difference between the outer diameter of the hollow tube and the inner diameter of the aperture when the former is larger than latter, which produces a pressing force after the insertion and fixation.

When the portions to be bonded extend to the whole area and the firm bonding is required, the hollow tube is inserted into and fixed to the aperture of the bushing base raw plate side without the presence of air, another gas or impurities between the aperture and the outer surface of the hollow tube so that the thermal diffusion may be conducted on the whole surface to be bonded. Since, in this way, the same bonding strength as the strength of the mother material may be obtained neither cracks nor defects can be produced even if the bushing base plate is deformed after it is employed for a long period of time. Since, further, the spinning of the glass fibers is conducted at a temperature of 1100 to 1400° C., the thermal diffusion further proceeds during the operation so that no lowering of the bonding strength is expected.

When a flow-out aperture having a thin wall is required for manufacturing thin glass fibers or the like, the strength of the pipe itself is low, and if the bushing base raw plate and the base end of the pipe are perpendicularly crossed, the weight of the glass and the spinning strength may damage the crossed portion. For reinforcing the crossed portion, a hollow tubular swelling is formed on the bushing base raw plate and a hollow tube or a thin wall pipe is inserted into an aperture perforated through the central portion of the swelling so that the bonding portion of the bushing base raw plate and the pipe constituting the flow-out aperture is guarded by the swelling so as to provide no chance of destruction of this bonding portion.

In the present invention, the simple bonding may satisfy the object thereof, or the bonding portion may be further strengthened effectively in view of its shape by molding the shape of the flow-in aperture into which glass flows in by means of plastic processing or by changing the length and the shape of the swelling and the hollow tube. Another hollow tube made of different material may be employed or the material of the flow-out aperture may be that composed of Pt or an Pt alloy and Au alloyed therewith. No lowering of strength is expected.

Also according to the process of the second invention, the same function as that of the first invention may be realized. However, in the second invention, the hollow tube can also be inserted into the aperture after the tube is enlarged from the inside.

As mentioned in the bushing base plate of the third invention, the bushing base raw plate and the hollow tube are tightly fixed to each other by the plastic deformation treatment at the time of inserting the hollow tube into the aperture of which a aperture size of the glass flow-in side is larger perforated through the bushing base raw plate or thereafter, and are bonded by means of the thermal diffusion. The careful inserting operation and the careful plastic deformation processing for eliminating the contamination of gas and impurities enable to maintain the inner aperture surface of the bushing base plate and the outer hollow tube surface clean and to keep them tightly. Since they are subjected to the thermal treatment under the condition that they are fixed under a certain inner pressure, the both metal materials are bonded to each other by means of the mutual diffusion to make the strength the same as that of the original metal material. The plastic deformation processing after the thermal diffusion and the next thermal diffusion enable to obtain not only a firmly bonded product but also a smooth bonded surface at the bonding boundary recognized on the surface. The shape of the hollow tube may be any one of a straight tube, tapered tube, a rounded tube, and may be one having a tapered or rounded portion at an upper end thereof or one having a stepped portion. In case of the tapered or rounded tube, in order to introduce impurities, a gas and the like between the said tapered portion or rounded portion and the hollow tube to maintain a constant inner pressure both on the clean metal surfaces, it is necessary to make the outer size of a part of the tapered or rounded portion larger than the aperture size of glass flow-out side of the bushing base raw plate. It is necessary to suitably adjust the size of the aperture perforated through the bushing base raw plate and the tapered angle and the rounded portion so s to tightly adhere from the upper portion of the tapered or rounded portion to the lower portion thereof to the whole surface of the aperture of the bushing base raw plate or the aperture wall of the glass flow-out size. When the number of tapers is one, the tapered angles of the aperture of the bushing base raw plate and of the tapered portion formed on the hollow tube is preferably between 0.01 and 120°, and when the the said number is two or more, at lest one of the tapered angles is preferably between 0.01 and 120°. The reasons thereof are that no effect can be produced when the angle is below this value, and the inner diameter of the hollow tube is made to be too small in relation to the diameter of the glass glow-out side of the bushing base plate ordinarily employed considering the relation between the thickness of the bushing base plate and the diameter of the glass flow-out side so as to make the employment of the hollow tube meaningless when the angle exceeds the above value so that no effects may be obtained by the presence of the tapered portion.

When the periphery of the hollow tube at the glass flow-out side of the bushing base raw plate is coated with the base plate raw plate material, the bonding between the bushing base raw plate and the hollow tube is made to be stronger. Since the thickness of the bushing base raw plate is made to be as thin as possible in the view point of economy so long as it may be endured, the length may be insufficient required for the bonding but the bonding strength per a flow-out aperture increases with the increase of the bonding area. The most important is that when the bushing base plate is deformed and curved by the pressure of glass after a long period of time of operation, the deformation of the bushing base plate by means of the curvature accompanies the deformation of the aperture due to the bending of the lower portion of the bushing base plate. When in this case the hollow tube is coated for reinforcement, characteristically no deformation is produced at the lower portion bonded to the hollow tube by means of the coating. The sectional shape of the hollow tube employed may be appropriately selected depending on a sectional shape of a glass fiber desired. When the glass fiber having the circular section is desired the hollow tube having the circular outer and inner shapes is employed. When the glass fiber having the irregular section is desired, the hollow tube having the irregular outer and inner shapes is employed. The irregular shape employed herein is any shape such as a triangle, a square, an ellipse, an oval, a Y-shape and the like other than a circle.

In accordance with the process of preparing the bushing base plate of the present invention, the portions to be bonded can be orderly bonded over a whole area. For performing the orderly bonding, the insertion and the fixation are required to be carried out without the introduction of air, another gas and impurities between the aperture of the bushing base raw plate and the outer surface of the hollow tube to be bonded. Since, according to the process of the invention, the wall of the tapered aperture of the bushing base raw plate is tightly adhered to the periphery of the hollow tube while the aperture is rubbed with the top or middle portion of the hollow tube when the hollow tube is inserted into the tapered aperture perforated through the bushing base plate, such an impurity as air, a gas or the like present on the aperture wall is expelled by the top or middle portion of the hollow tube so that the bonding can be carried out under the condition free from these impurities. When the thermal diffusion is performed under the said condition free from the impurities, the thermal diffusion can be completely conducted over the whole are of the bonded portions. Since the same bonding strength as the material strength of the mother material is obtained, neither cracks nor defects are produced even if the bushing base plate is deformed after a long period of time of operation.

When the material of at least one of the both members to be bonded (bushing base raw plate and hollow tube) is platinum of which grains are stabilized by an oxide or a platinum alloy of which grains are stabilized by an oxide, this kind of material loses the oxide mainly participating in the reinforcing mechanism which floats to the surface and no stabilized grains exist at the welded portion in case that the welding is employed for the bonding so that the material loses its characteristic as the platinum of which grains are stabilized by an oxide or the platinum alloy of which grains are stabilized by an oxide. Since the considerable lowering of the strength occurs at the bonded portion due to the above reason, a problem arises that the strength at the portion becomes very weak. Since, however, no welding is conducted in the process of the present invention, no lowering of the strength occurs so that the strength at the bonded portion can be the substantially same as that of the raw material.

For reinforcing the hollow tube by coating the periphery thereof at the glass flow-out side of the bushing base plate with the base raw plate material, a swelling may be formed surrounding the aperture at the glass flow-out side of the bushing base raw pate when the glass flow-out aperture is produced through the bushing base plate, and when the periphery of the aperture at the glass flow-in side is molded or the flow-out aperture is adjusted to a desired shape and dimensions after the bonding of the hollow tube to the bushing base raw plate, the approach of the bushing base raw plate material to the periphery of the hollow tube may be utilized for forming the above coating of the base raw plate material at the time of forming the taper by employing a mold of which an inlet shape has a taper or a step and which receives the flow-out aperture.

The reason why the temperature of thermal treatment is restricted to the range between 500° C. and a temperature 20° C. lower than the melting point of the material is that the diffusion does not occur below 500° C. and the control of the temperature distribution can be performed only in a limited range and the temperature may partially exceed the melting point of the material resulting in the melting of the material if the temperature exceeds the point 20° C. lower than the melting point of the material.

The material employed for the bushing base raw plate and for the hollow tube is selected in consideration of the material of melted glass, spinning conditions and an intensity life, and if Au is added to the material of the hollow tube, the material is difficult to be wetted with glass and an end breakage of the glass during the spinning seldom occurs so that the stable spinning may be obtained.

EXAMPLES

Examples of a bushing base plate and its preparation according to the present invention will be described referring to the drawings. However, these Examples do not restrict the present invention. At first, Examples of a bushing base plate and its preparation according to the first and the second invention swill be describes as Examples 1 to 5, and then other Examples according to the third and fourth inventions will be describes as Examples 6 to 12.

Example 1

Figure 4:
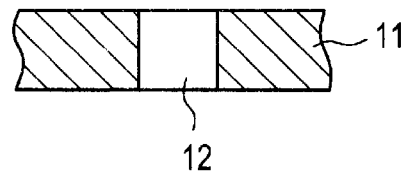
FIG. 4 is a sectional view showing an aperture of a bushing base raw plate of Example 1.

At first, a PT—Rh (10%) alloy employed as bushing base raw plate material was rolled by means of a rolling machine to a thickness of 1.5 mm and was cut to a piece having a width of 100 mm and a length of 500 mm. Through this raw plate 11, 800 holes were zigzag perforated with a pitch of 3.5 mm by means of press processing to make apertures 12 as shown in FIG. 4. The size of the aperture through the bushing base plate was 1.9 mm in diameter.

Figure 5:
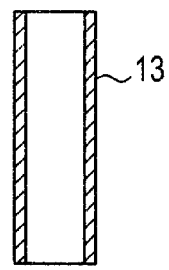
FIG. 5 is a sectional view showing a hollow tube of Example 1.
Figure 6:
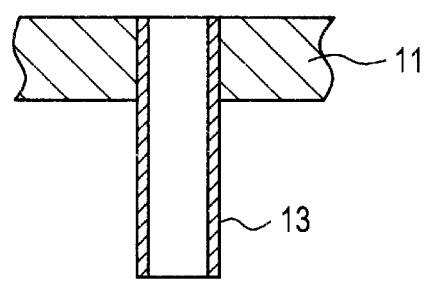
FIG. 6 is a sectional view showing the bonding portion between the aperture of the bushing base plate and the hollow tube.

A hollow tube 13 as shown in FIG. 5 was draw-processed, cut and molded to have an outer diameter of 2.0 mm, an inner diameter of 1.5 mm, a thickness of 0.25 mm ad a height of 6.5 mm. After this hollow tube 13 was set on the aperture 12, a die of which a dimension was larger than the aperture 12 perforated through the bushing base raw plate 11 by 0.2 mm was set under the plate and the hollow tube was inserted into the aperture employing a punch having the same dimension as the outer diameter of the hollow tube 13 as an upper die at an interference of 0.05 mm, the thermal diffusion at 1400° C. was conducted for five hours in an electric furnace. It was confirmed that the fixed portion became the same material because the grains at the bushing base plate's aperture 12 side and at the outer periphery of the hollow tube 13 diffused to each other so that the crystal growth spanned the boundary of the bonding and that the bonding was completed over the whole area. A bushing was prepared by bonding the bushing base plate thus obtained to an upper box-like vessel constituting a terminal and a fusion furnace with a filter by means of arc welding.

Example 2

Figure 7:
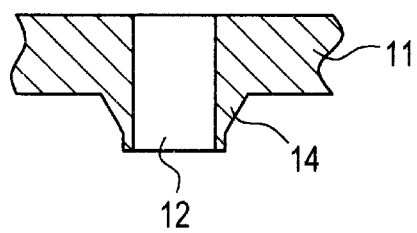
FIG. 7 is a sectional view showing a bushing base raw plate having a swelling of Example 2.
Figure 8:
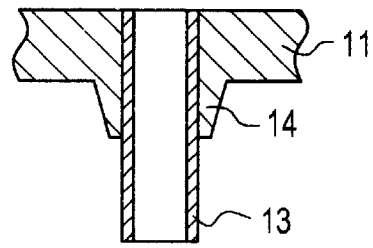
FIG. 8 is a sectional view showing the bonding portion between the swelling of the raw plate and the hollow tube of FIG. 7.

During the molding of the above bushing base plate, a swelling 14 having the shape shown in FIG. 7 was formed on the bushing base raw plate by means of press processing and an aperture 12 was perforated through the cantral portion thereof. The diameter of the aperture was 1.9 mm and the length was 3 mm. A hollow tube 13 having an outer diameter of 2.0 mm, an inner diameter of 1.5 mm and a thickness of 0.25 mm was inserted into the aperture 12 at an interference of 0.05 mm, and according to the same conditions of Example 1, a bushing plate shown in FIG. 8 was obtained.

Example 3

Figure 10:
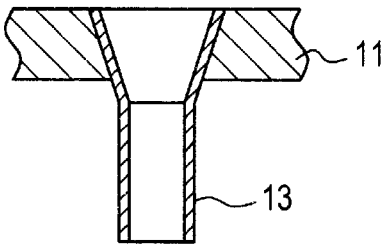
FIG. 10 is a sectional view showing the bonding portion between an aperture of a conventional bushing base plate and a hollow tube of another embodiment of Example 3.
Figure 11:
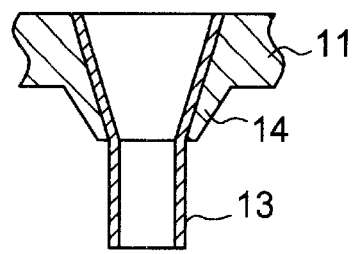
FIG. 11 is a sectional view showing the bonding portion between an aperture of a conventional bushing base plate and a hollow tube of a further embodiment of Example 3.

In the processes of Examples 1 and 2, the thermal diffusion at 1400° C. was carried out for five hours in an electric furnace and then the plate as molded by means of pressing and by employing a punch having a taper and a die to form a taper of 30° at the glass flow-in side and a two step taper at the flow-out side to prepare a similar bushing plate to those of the above Examples. While, in addition, base plates shown in FIGS. 10 and 11 were prepared by means of molding, they were excellent in the shape and the bonding conditions.

Example 4

The same processing as that of Example 3 was performed employing a Pt(95%)—Au(5%) alloy as material of the hollow tube or the flow-out aperture. The reason why 5% of Au was added was to achieve the improvement of anti-wettability at the time of spinning. The splendid effects for bonding were obtained partially because the diffusion speed of Au was high.

Example 5

During the molding of the bushing base plate in Example 1, a swelling 14 having the shape shown in FIG. 7 was formed on the bushing base raw plate by means of press processing and an aperture 12 was perforated through the cantral portion thereof. The diameter of the aperture was 2.5 mm and the length was 3 mm. A hollow tube 13 having an outer diameter of 2.45 mm, an inner diameter of 1.95 mm and a thickness of 0.25 mm was inserted into the aperture 12, and the inner diameter of the hollow tube was increased to 2.1 mm by enlarging the original inner diameter of the hollow tube employing a punch hang a top planar bullet like end of which a diameter was 2.1 mm in a die which is not shown. The hollow tube was fixed to the aperture 12 at the center of the swelling 14 at a certain interference and the thermal treatment at 1400° C. was conducted in an electric furnace for three hours followed by the same preparation processes to obtain a bushing base plate having a section shown in FIG. 8.

Figure 9:
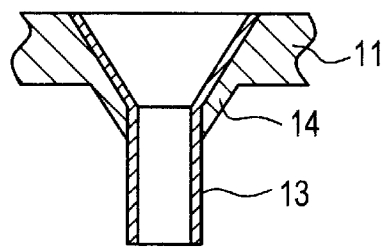
FIG. 9 is a sectional view showing a bushing base plate of Example 3 prepared by further modifying the bushing base plate of FIG. 8.

Upon completion of the thermal treatment, a taper of 30° may be formed at the glass flow-in side by means of plastic processing as shown in FIG. 9 and the thermal treatment may be repeated.

Glass fibers manufactured by employing the respective bushings of Examples 1 to 5 exhibited a longer life than glass fibers manufactured with a conventional bushing. Moreover in Example 4, end breakage during spinning was scarce because the top chip portion was difficult to be wetted.

Example 6

Figure 12:
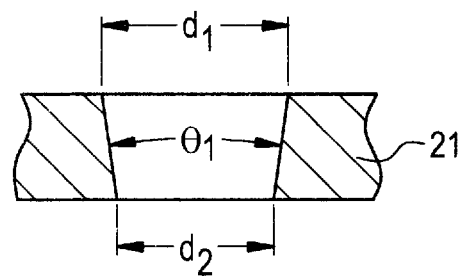
FIG. 12 is a sectional view showing a bushing base raw plate having an aperture employed in Example 6.

At first, a PT—Rh (10%) alloy employed as bushing base raw plate material was rolled by means of a rolling machine to a thickness of 1.5 mm and was cut to a piece having a width of 50 mm and a length of 400 mm. Through this raw plate 21, 400 holes were perforated having a circular section by means of press processing as shown in FIG. 12 The dimensions were as follows. Diameter of glass flow-in side of the bushing base plate ($d_1$) was 2.5 mm, a diameter of a glass flow-out end ($d_2$) was 2.1 mm and a tapered angle $\theta_1$ was 15.2°.

Figure 13:
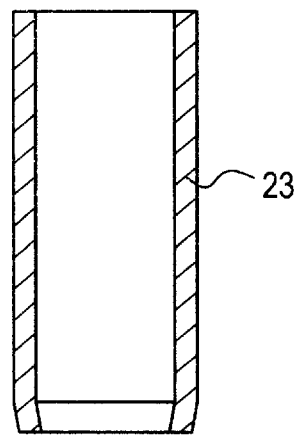
FIG. 13 is a sectional view showing one example of a hollow tube employed in Example 6.

A Pt—Au (5%) alloy was processed by drawing and cutting to obtain a pipe-like hollow tube 23 which had, as shown in FIG. 13, inner and outer circular shapes of which an outer diameter, an inner diameter and a length were 2.6 mm, 2.0 mm and 6 mm, respectively, and had one tapered end having an outer diameter of 1.9 mm formed by means of pressing.

Figure 14:
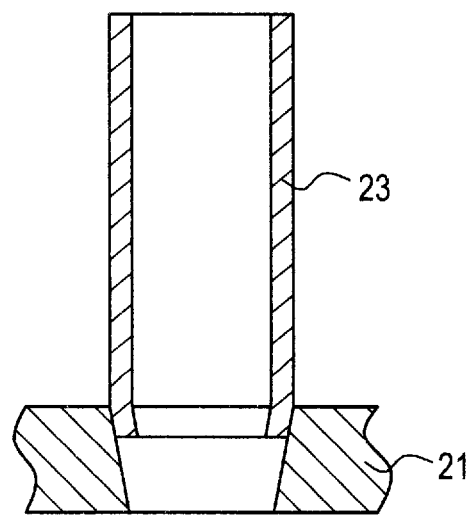
FIG. 14 is a sectional view showing one step of a preparing process of Example 6.
Figure 15:
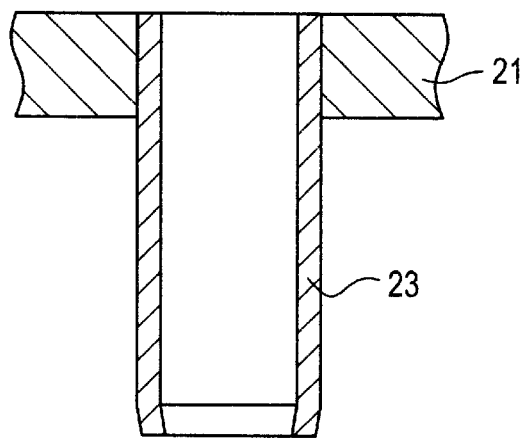
FIG. 15 is a sectional view showing another step in Example 6.
Figure 16:
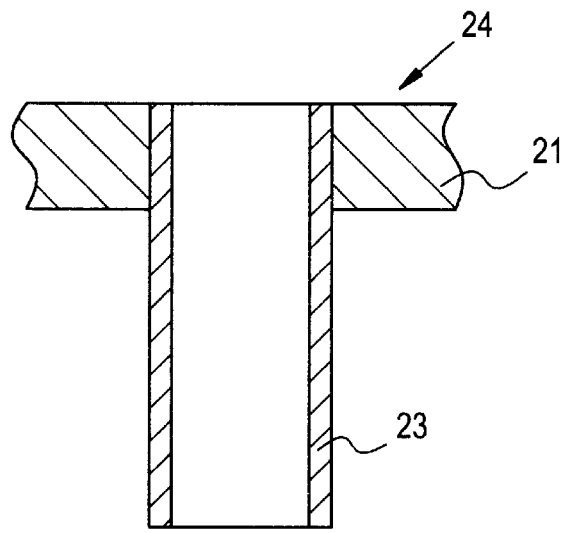
FIG. 16 is a sectional view showing a further step in Example 6.

The hollow tube 23 shown in FIG. 14 was inserted into an aperture perforated through the above bushing base raw plate 1 from its larger diameter side, and fixed thereto as shown in FIG. 15. Thereafter, a thermal treatment at 1400° C. was conducted for three hours to bond the bushing base raw plate 21 and the hollow tube 23 by means of thermal diffusion, and the one end of the hollow tube 23 was made back to a straight pipe by plastic deformation to obtain a bushing base plate 24 as shown in FIG. 16.

The section of the bushing base plate 24 thus obtained was observed with a microscope to find out that the materials of the both of the bushing base raw plate and the hollow tube 23 were diffused through the thermal diffusion at the boundary to constitute an integrated material in which the crystals thereof were intricate and the sufficient metal bonding was obtained.

Example 7

A Pt—Rh(10%)—Pd(5%) alloy employed as bushing base raw plate material was rolled by means of a rolling machine to a thickness of 1.5 mm and was cut to a piece having a width of 70 mm and a length of 600 mm. Through this raw plate 21, 800 holes were perforated having a circular section by means of press processing as shown in FIG. 12. The dimensions were as follows, $d_1$=2.2 mm and $d_2$=1.6 mm, and a tapered angle $\theta_1$ was 22.6°.

Figure 17:
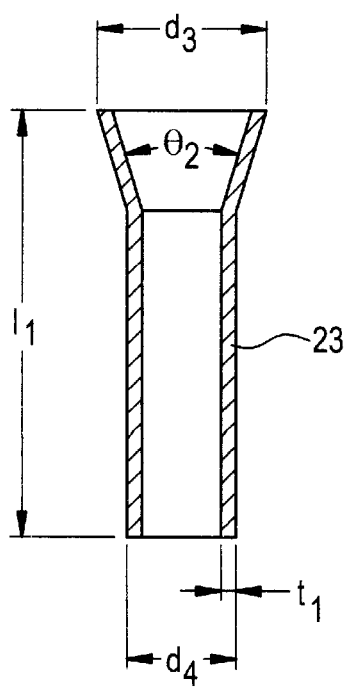
FIG. 17 is a sectional view showing a hollow tube employed in Example 7.

A Pt—Rh(10%)—Au(5%) alloy was processed to obtain a pipe-like hollow tube 23 which had, as shown in FIG. 17, inner and outer circular shapes in which $d_3$=2.4 mm, $d_4$=1.5 mm, a tapered angle $\theta_2$ is 16°, $t_1$=0.2 mm and $l_1$=6 mm.

Figure 18:
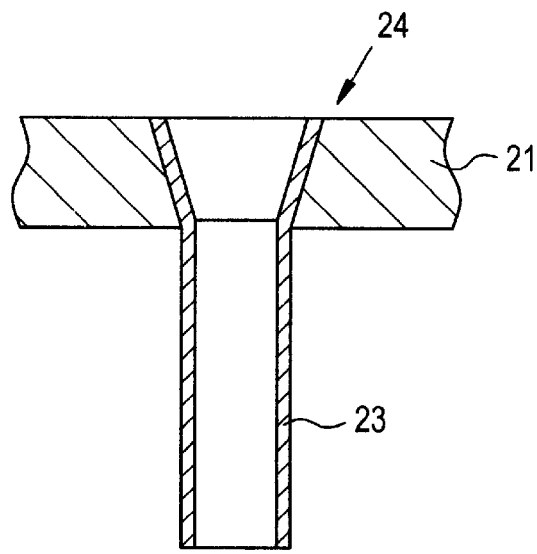
FIG. 18 is a sectional view showing the hollow tube and a raw plate combined with each other of FIG. 17.

The hollow tube 31 was inserted into an aperture perforated through the above bushing base raw plate 21 and fixed thereto as shown in FIG. 18. Thereafter, a thermal treatment at 1200° C. was conducted for six hours to bond the bushing base raw plate 21 and the hollow tube 23 by means of thermal diffusion to obtain a bushing base plate 24.

The section of the bushing base plate 24 thus obtained was observed with a microscope to find out that the materials of the both of the bushing base raw plate 21 and the hollow tube 23 were diffused through the thermal diffusion at the boundary to constitute an integrated material in which the crystals thereof were intricate and the sufficient metal bonding was obtained.

Example 8

Figure 19:
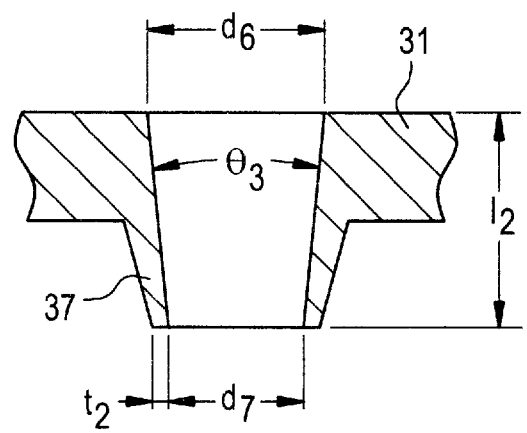
FIG. 19 is a sectional view showing a bushing base raw plate employed in Example 8.

A platinum plate of which grains are stabilized by an oxide prepared by internally oxidizing Pt, bushing base raw plate material, by means of the addition of 0.3% of Zr was rolled by means of a rolling machine to a thickness of 1.5 mm and was cut to a piece having a width of 70 mm and a length of 600 mm. On this raw plate 31, a hollow tube like swelling having a circular section was formed by means of press processing as shown in FIG. 19. The dimensions were as follows. $d_6$=2.4 mm and $d_7$=1.8 mm, $t_2$=0.5 mm, $l_2$=3.0 mm and $\theta_2$=11.4°.

Figure 20:
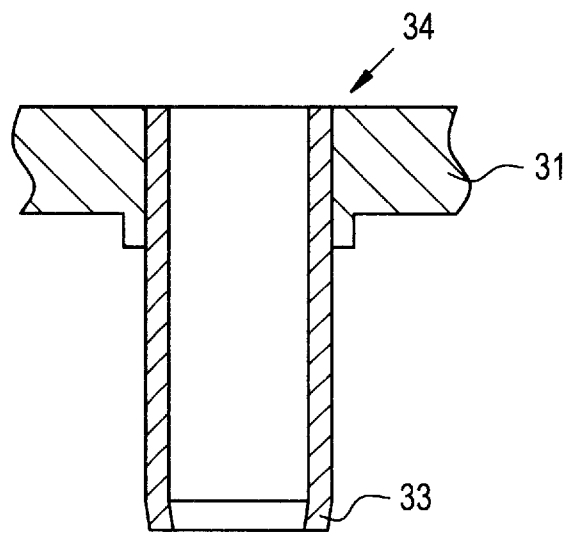
FIG. 20 is a sectional view showing the hollow tube and a raw plate combined with each other of FIG. 19.

A Pt—Zr(0.3%) alloy was processed by drawing and cutting to obtain a hollow tube 33 of which a shape was circular as shown in FIG. 20 having an outer diameter of 2.6 mm, an inner diameter of 2.0 mm and a length of 7 mm, and having a tapered end of which an outer dimension was 1.7 mm.

The hollow tube was inserted into an aperture perforated through the above bushing base raw plate 31 and fixed thereto as shown in FIG. 20. Thereafter, a thermal treatment at 1400° C. was conducted for 12 hours to bond the bushing base raw plate 31 and the hollow tube 33 by means of thermal diffusion to obtain a bushing base plate 34.

Figure 21:
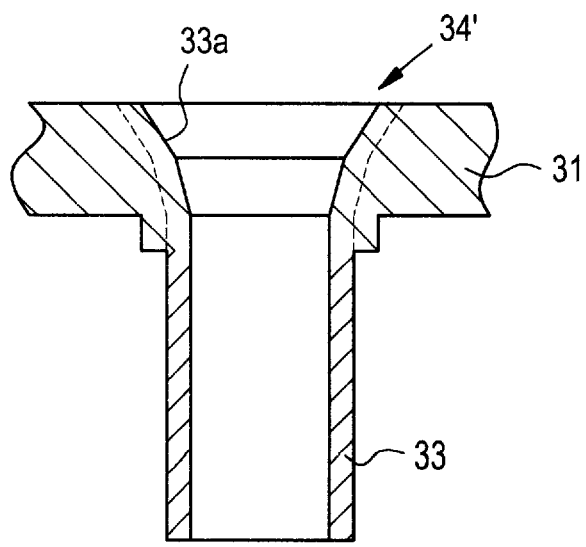
FIG. 21 is a sectional view showing an alternative embodiment of FIG. 20.

The section of the bushing base plate 34' thus obtained observed with a microscope was as shown in FIG. 21 in which the organization of the hollow tube and the bushing base raw plate was identical and no boundary was observed so that the both were bonded more firmly.

Example 9

Figure 22:
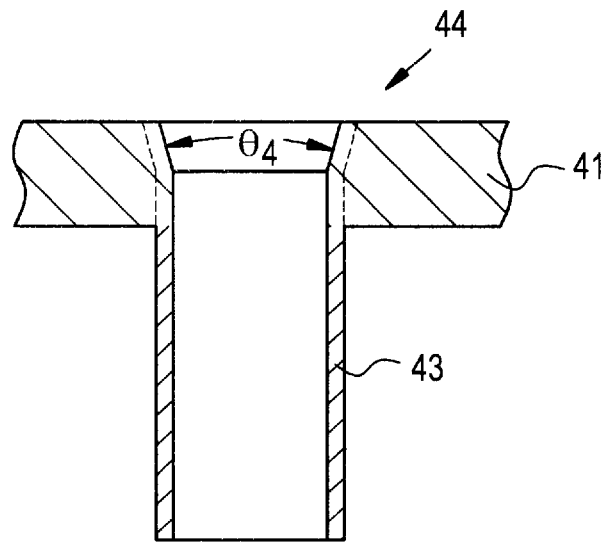
FIG. 22 is a sectional view showing a bushing base plate of Example 9.

After the periphery of the aperture at the glass flow-in side was processed by pressing to the shape having a tapered angle of 30° employing the bushing base plate shown in FIG. 16 obtained in Example 5, the plastic deformation was caused for enlarging the inner diameter by 0.2 mm to prepare a bushing base plate 44 as shown in FIG. 22.

The section of the bushing base plate 44 thus obtained was observed with a microscope to find out that no boundary between the hollow tube 43 and the bushing base raw plate 41 was observed and the sufficient metal bonding was obtained.

Example 10

Figure 23:
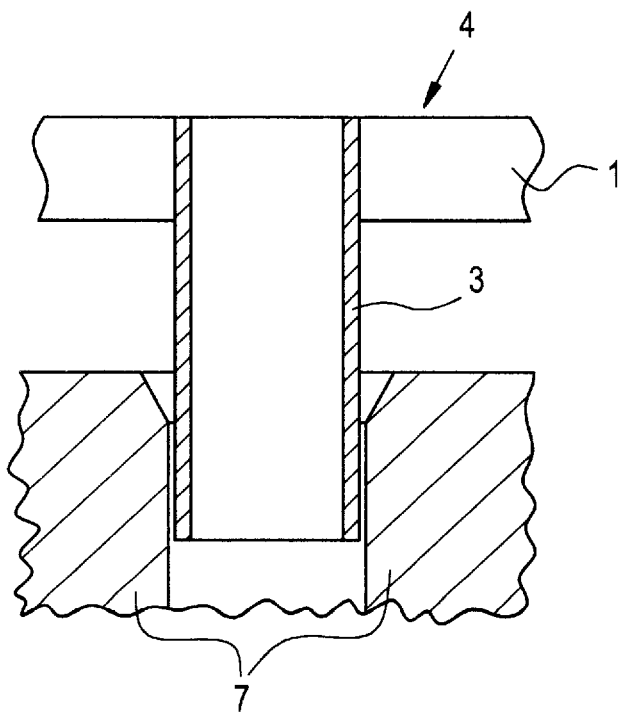
FIG. 23 is a sectional view showing a bushing base plate of Example 10.
Figure 24:
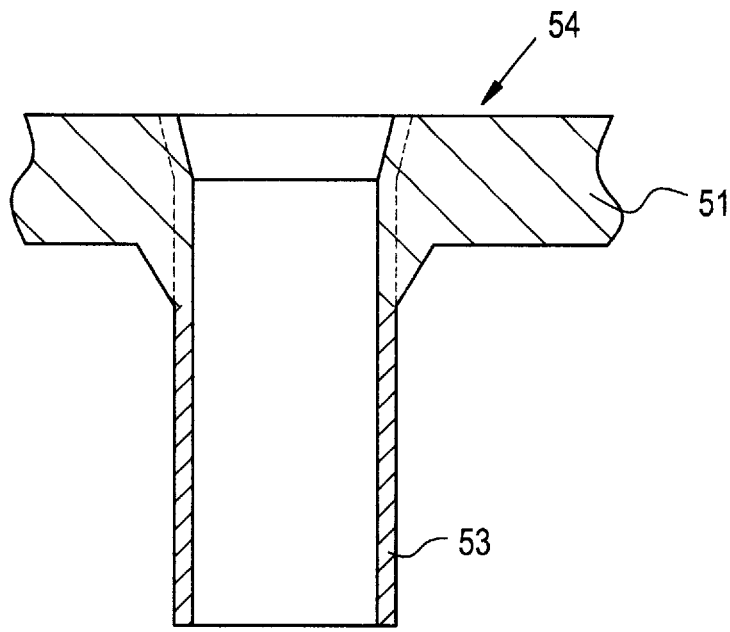
FIG. 24 is a sectional view showing an alternative embodiment of Example 10.

A taper-like plastic deformation was caused by press processing the periphery of the aperture at the glass flow-in side providing as a lower mold at the time of pressing a mold having a taper at the periphery of the inlet for inserting the hollow tube therein as shown in FIG. 23 while employing the bushing base plate shown in FIG. 16 obtained in Example 6. Thereafter, the thermal diffusion treatment at 1400° C. was again conducted for one hour to obtain a bushing base plate 54 plastically deformed as shown in FIG. 24.

The bushing base plate 54 thus obtained was covered and reinforced with the bush base raw plate material at the periphery of the hollow tube of the glass flow-out side of the bushing base raw plate 51.

Example 11

Figure 25A:
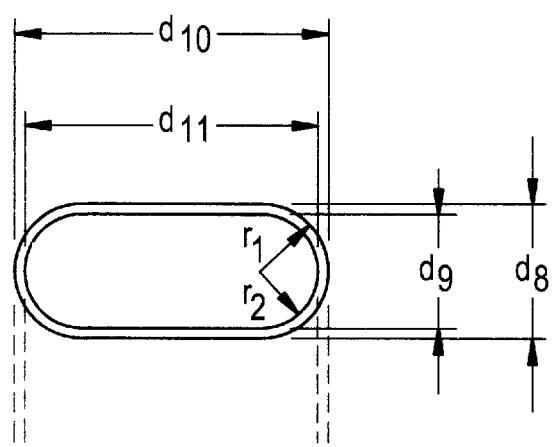
FIG. 25 is a view showing an aperture of a bushing base raw plate of Example 11.
Figure 25B:
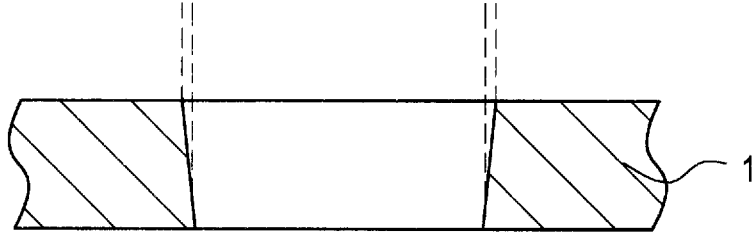
Figure 26A:
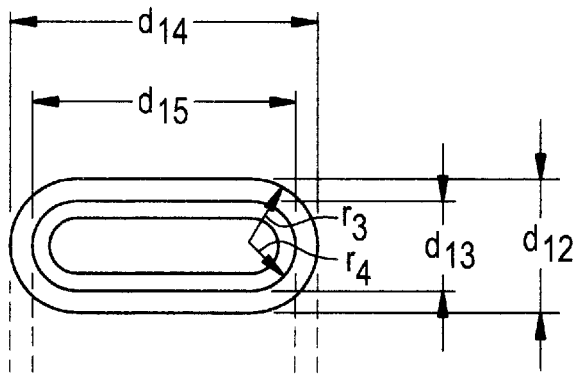
FIG. 26 is a sectional view showing a hollow tube of Example 10.
Figure 26B:
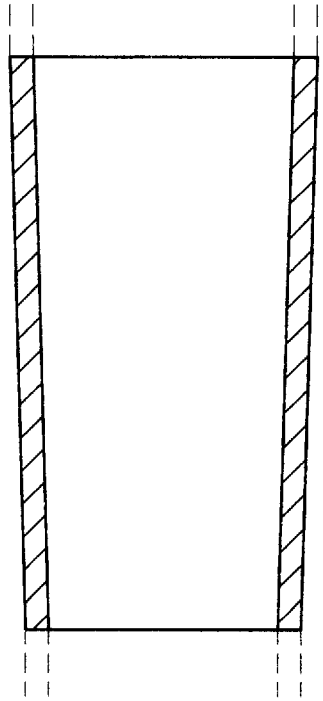
Figure 26C:
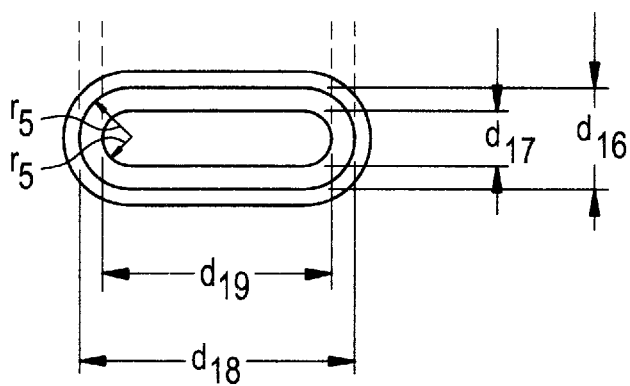
Figure 27:
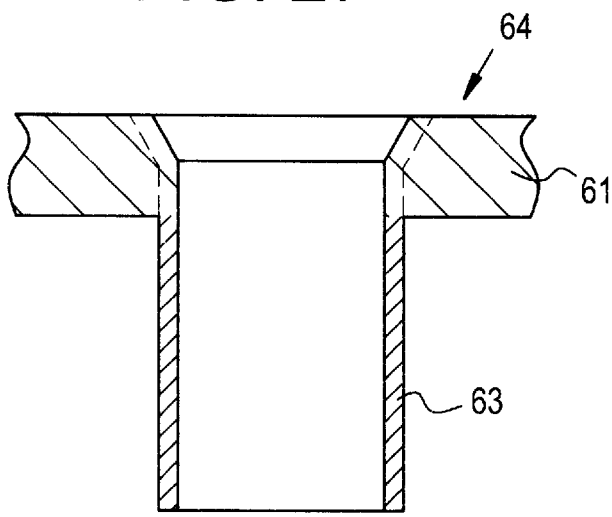
FIG. 27 is a sectional view showing a bushing base plate of Example 10.

The sectional shapes of the apertures perforated through the bushing base raw plate of Example 5 were made to be elliptic as shown in FIGS. 25 (a) and (b) of which dimensions were as follows. Glass flow-in side: $d_8$=1.5 mm, $d_{10}$=3.5 mm and $r_1$=0.75 mm. Glass flow-out side: $d_9$=1.3 mm $d_{11}$=3.3 mm and $r_2$=0.65 mm. The shape of the hollow tube was made to be one shown in FIGS. 26 (a), (b) and (c) of which dimensions were as follows. Glass flow-in side; $d_{12}$=1.6 mm, $d_{13}$=1.1 mm, $r_2$=0.8 mm, $d_{14}$=3.6 mm, $d_{15}$=3.1 mm and $r_4$=0.55 mm, Glass flow-out side: $d_{16}$=1.2 mm, $d_{18}$=3.2 mm, $d_{17}$=0.77 mm, $d_{19}$=2.7 mm, $r_5$=0.6 mm and $r_6$=0.35 mm. The conditions were the same as those of Example 5 except that the length of the hollow tube was 7 mmm and the tube had a taper on the whole length. After the thermal diffusion, the periphery of the aperture of te glass flow-in side was press processed to have a taper and the bonded member was thermally treated at 1200° C. for one hour followed by the deformation of the flow-out aperture to a straight one to obtain a bushing base plate 64 as shown in FIG. 27.

The section of the bushing base plate 64 thus obtained was observed with a microscope to find out that the materials of the both of the bushing base raw plate and the hollow tube 63 were diffused through the thermal diffusion at the boundary to constitute an integrated material in which the crystals thereof were intricate and the sufficient metal bonding was obtained.

Example 12

Figure 28:
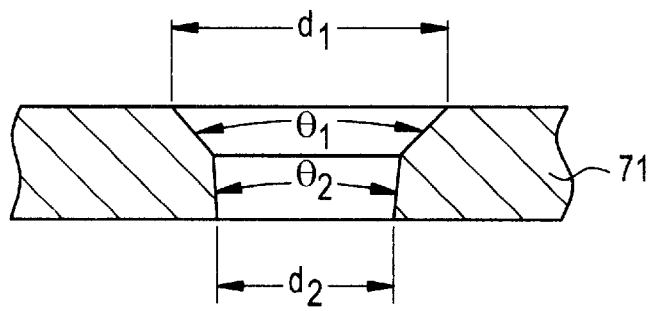
FIG. 28 is a sectional view showing a bushing base raw plate of Example 12.
Figure 29:
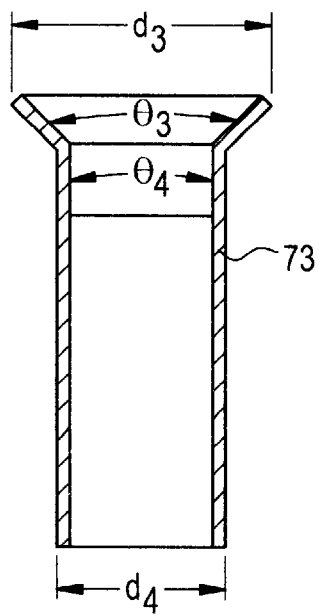
FIG. 29 is a sectional view showing a hollow tube of Example 12.
Figure 30:
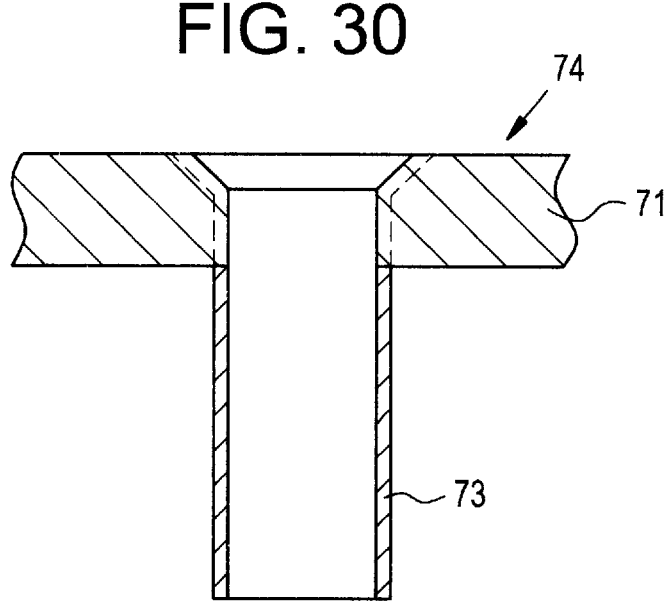
FIG. 30 is a sectional view showing a bushing base plate of Example 12.
Figure 31:
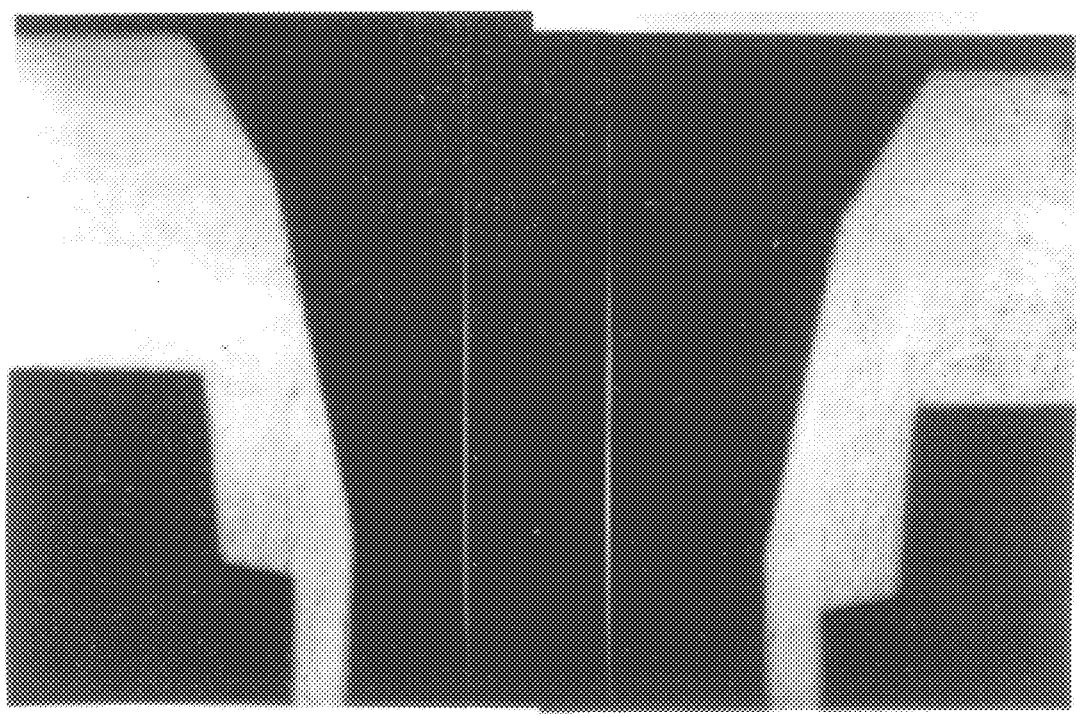
FIG. 31 is a microphotograph showing a sectional organization of a bushing base plate obtained in Example 8.

The sectional shape of an aperture perforated through a platinum-rhodium ally plate of which grains are stabilized by an oxide employed as bushing base raw plate material was that having two-step tapers as shown in FIG. 28 and the following dimensions, $\theta_1$=90°, $\theta_2$=10°. The sectional shape of the hollow tube was that as shown in FIG. 29 to have the following dimensions. $\theta_3$=85°, $\theta_4$=8°, $d_3$=3.6 mm and $d_4$=2.2 mm. After the hollow tube was inserted into the aperture of the raw plate 71 and fixed thereto as shown in FIG. 30, the thermal treatment was conducted at 1500° C. for one hour for bonding the bushing base raw plate 71 and the hollow tube 73 by means of thermal diffusion to prepare a bushing base plate 74.

The section of the bushing base plate 74 thus obtained was observed with a microscope to find out that the materials of the both of the bushing base raw plate and the hollow tube 73 were diffused through the thermal diffusion at the boundary to constitute an integrated material in which the crystals thereof were intricate and the sufficient metal bonding was obtained.

A bushing was prepared by bonding the respective bushing base plates obtained in Examples 1 to 12 to an upper box-like vessel constituting a terminal and a fusion furnace with a filter by means of arc welding. While glass fibers were continuously manufactured employing the bushing, no problems were observed after a lapse of half year in the bushings employing the bushing base plate of Examples 1 to 12.

What is claimed is:

1. A process for preparing a bushing base plate which comprises:
    (a) forming a circular or irregular aperture through a bushing base raw plate, said aperture having inner surfaces and inner diameters;
    (b) inserting a hollow tube having outer surfaces and outer diameters into said aperture; and
    (c) bonding the hollow tube to the bushing base raw plate by means of thermal diffusion, said outer diameters prior to said insertion being greater than said inner diameters, thereby producing a pressing force between the outer surfaces of the hollow tube and the inner surfaces of the aperture upon said insertion.

2. A process as claimed in claim 1, wherein the hollow tube is comprised of a material which differs from a material of which the bushing base raw plate is comprised.

3. A process for preparing a bushing base plate which comprises:
    (a) forming a circular or irregular aperture through a bushing base raw plate, said aperture having inner surfaces and inner diameters;
    (b) inserting a hollow tube into said aperture, said tube having inner and outer surfaces and corresponding inner and outer diameters;
    (c) enlarging the inner diameters of the hollow tube from inside the tube, thereby producing a pressing force between the outer surface of the hollow tube and the inner surfaces of the aperture; and
    (d) bonding the hollow tube to the bushing base raw plate by means of thermal diffusion.

4. A process as claimed in claim 3, wherein the hollow tube is comprised of a material which differs from a material of which the bushing base raw plate is comprised.

5. A process for preparing a bushing base plate which comprises:
    (a) forming a circular or irregular aperture through a bushing base raw plate, said aperture having inner surfaces and inner diameters and a glass flow-out side and forming a swelling surrounding said aperture at the glass flow-out side;
    (b) perforating the center of the swelling;
    (c) inserting a hollow tube having outer surfaces and outer diameters into said aperture; and
    (d) bonding the hollow tube to the bushing base raw plate by means of thermal diffusion, said outer diameters prior to said insertion being greater than said inner diameters, thereby producing a pressing force between the outer surfaces of the hollow tube and the inner surfaces of the aperture upon said insertion.

6. A process as claimed in claim 5, wherein the bonded hollow tube and the swelling are molded by means of plastic deformation.

7. A process for preparing a bushing base plate which comprises:
    (a) forming a circular or irregular aperture through a bushing base raw plate, said aperture having inner surfaces and inner diameters and a glass flow-out side and forming a swelling surrounding said aperture at the glass flow-out side;
    (b) perforating the center of the swelling;

(c) inserting a hollow tube into said aperture, said tube having inner and outer surfaces and corresponding inner and outer diameters;

(d) enlarging the inner diameters of the hollow tube from inside the tube, thereby producing a pressing force between the outer surfaces of the hollow tube and the inner surfaces of the aperture; and (e) bonding the hollow tube to the bushing base raw plate by means of thermal diffusion.

8. A process as claimed in claim 7, wherein the bonded hollow tube and the swelling are molded by means of plastic deformation.

9. A process for preparing a bushing base plate which comprises:

(a) perforating a bushing base raw plate so as to create an aperture having a circular section with a taper angle θ1 or having an irregular section with a taper angle θ1 and a radius of curvature r1 and a glass flow-in side and a glass flow-out side, the diameter of the aperture on the glass flow-in side being greater than the diameter of the aperture on the glass flow-out side;

(b) inserting into said aperture from the glass flow-in side to the glass flow-out side and fixing to said aperture a hollow tube having an upper portion and a glass flow-in end provided with an upper taper with either an angle θ2 wherein angle θ1 is greater than θ2 or a radius of curvature r3 wherein radius r3 is greater than r1, said tube having a circular section when said aperture has a circular section or an irregular section when said aperture has an irregular section, said fixing being carried out in a manner so as to tightly adhere the upper portion of the hollow tube to the whole wall of the aperture; and (c) bonding the hollow tube to the bushing base raw plate by means of thermal diffusion.

10. A process as claimed in claim 9, wherein the aperture is tapered and the hollow tube has tapered glass flow-in and flow-out ends and the angles of the taper range between 0.01 and 120°.

11. A process as claimed in claim 9, wherein the aperture and the hollow tube each contain at least two tapers and the number of tapers contained in the aperture is the same as the number of tapers contained in the hollow tube.

12. A process as claimed in claim 11, wherein two tapers are formed in the aperture, at least one tapered angle thereof being between 0.01 and 120° and two tapers are formed on the outer surface of the hollow tube, at least one tapered angle thereof being between 0.01 and 120°.

13. A process as claimed in claim 9, wherein the aperture contains a swelling portion surrounding the glass flow-out side.

14. A process as claimed in claim 9, wherein as a consequence of said bonding, a plastic deformation is formed at a bonding boundary between (i) said glass flow-in side and/or said glass flow-out side, and (ii) the hollow tube.

15. A process as claimed in claim 6, wherein subsequent to said bonding, the glass flow-out side of the aperture is conformed to a desired shape and dimension.

16. A process as claimed in claim 14, wherein the bonding and plastic deformation are repeated one or more times.

17. A process as claimed in claim 9, wherein the bushing base raw plate is comprised of a material selected from the group consisting of a Pt—Rh alloy; a Pt—Rh—Pd alloy; platinum, the grains of which are stabilized by an oxide; a platinum alloy, the grains of which are stabilized by an oxide; a Pt—Au alloy; a Pt—Rh—Au alloy; a Pt—Rh—Pd—Au alloy; and the hollow tube is comprised of a material selected from the group consisting of a Pt—Au alloy; a Pt—Rh—Au alloy; a Pt—Rh alloy; a Pt—Rh—Pd alloy; platinum, the grains of which are stabilized by an oxide; and a platinum alloy, the grains of which are stabilized by an oxide.

18. A process as claimed in claim 9, wherein the thermal diffusion is conducted at a temperature in the range of 500° C. to a temperature of 20° C. lower than the melting point of the material of which the bushing base plate is comprised.

19. A bushing base plate comprising:

(a) a bushing base raw plate containing a circular or irregular aperture having inner surfaces and inner diameters; and (b) a hollow tube inserted into the aperture, said tube having outer surfaces and outer diameters, said tube being bonded to the bushing base raw plate by means of thermal diffusion, said outer diameters prior to said insertion being greater than said inner diameters, thereby producing a pressing force between the outer surfaces of the hollow tube and the inner surfaces of the aperture upon said insertion.

20. The bushing base plate of claim 19 wherein a hollow tubular swelling is integrally connected to an end of the wall forming said aperture.

21. The bushing base plate of claim 19 wherein the hollow tube is comprised of a material which differs from a material of which the bushing base raw plate is comprised.

22. A bushing plate comprising:

(a) a bushing base raw plate containing an aperture having a circular section with a taper angle θ1 or having an irregular section with a taper angle θ1 and a radius of curvature r1 and a glass flow-in side and a glass flow-out side, the diameter of the aperture on the glass flow-in side being greater than the diameter of the aperture on the glass flow-out side; and (b) a hollow tube having an upper portion inserted into the aperture from the glass flow-in side to the glass flow-out side of the aperture, said tube having, prior to insertion into the aperture, (i) a glass flow-out end which at its periphery is coated with a reinforcing material comprising a material of which the bushing plate raw plate is comprised and (ii) a glass flow-in end provided with an upper taper with either an angle θ2 wherein angle θ1 is greater than θ2 or a radius of curvature r3 wherein radius r3 is greater than r1, said tube having a circular section when said aperture has a circular section or an irregular section when said aperture has an irregular section, the upper portion of the tube being tightly inserted into the wall of the aperture and fixed thereto by means of thermal diffusion.

23. The bushing plate of claim 22, wherein the bushing base raw plate is comprised of a material selected from the group consisting of a Pt—Rh alloy; a PT—Rh—Pd alloy; platinum, the grains of which are stabilized by an oxide; a platinum alloy, the grains of which are stabilized by an oxide; a Pt—Au alloy; a Pt—Rh—Au alloy; a Pt—Rh—Pd—Au alloy; and the hollow tube is comprised of a material selected from the group consisting of a Pt—Au alloy; a Pt—Rh—Au alloy; a Pt—Rh alloy; a Pt—Rh—Pd alloy; platinum, the grains of which are stabilized by an oxide; and a platinum alloy, the grains of which are stabilized by an oxide.

* * * * *